Oct. 20, 1953  R. P. ADAMS  2,655,693
METHOD OF MAKING RUBBER STAMPS
Filed Aug. 19, 1950

INVENTOR:
RANDOLPH P. ADAMS
BY
ATTORNEYS.

Patented Oct. 20, 1953

2,655,693

UNITED STATES PATENT OFFICE 2,655,693

METHOD OF MAKING RUBBER STAMPS

Randolph P. Adams, University City, Mo.

Application August 19, 1950, Serial No. 180,397

2 Claims. (Cl. 18—47.5)

This invention relates to a process for making so-called "rubber stamps."

The making of rubber stamps has heretofore required the use of skilled labor in producing molds and matrices from which the rubber stamps are molded. One of the methods followed heretofore, when, as is most usual, single rubber stamps with different wordings are to be produced, has involved setting up type defining a die, casting from this die a plaster of Paris mold and vulcanizing the rubber stamps in the mold. As can be seen, this process involves a number of steps requiring skilled labor and time in process, but the resultant mold is destructible.

When the number of identical rubber stamps desired to be made was sufficiently large to justify the expense of manufacturing a permanent mold, a plastic or expensive sunk letter solid metal mold has been used.

One of the objects of this invention is to provide a novel method of manufacturing rubber stamps which is simple, rapid and cheap, can be performed by relatively unskilled labor, and which produces a uniform stamp. Other objects will be apparent to those skilled in the art in the light of the following specification and accompanying drawings.

In accordance with an illustrative embodiment of this invention, a rubber stamp is produced directly from a thin sheet matrix. This matrix is of such a type as to be embossed on one side and indented on the other with any desired characters and by a machine which has a series of individually actuable indenting elements whose faces have protuberances corresponding respectively to the mirror image of the various alphabetical characters; and the indenting elements may be actuated in the desired sequence by a typewriter-style keyboard. An example of such a machine is the well-known and readily available "Graphotype." Rubber stamp composition is molded in direct contact with the indented side of the plate, and vulcanized in the usual manner. The term "rubber," as used in the specification and claims, includes natural rubber, synthetic rubber, and any other suitable material of the nature of rubber, i. e., capable of having characters molded on its surface, of retaining them in the use to which rubber printing stamps are put, and of functioning as a printing stamp. The term "vulcanized" is used to indicate the setting or curing of the material, the exact procedure depending upon the character of the material used.

Referring now to the drawings.

Figure 2:
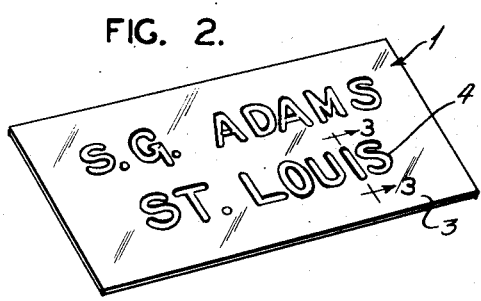
Figure 2 is a view in perspective of the indented side of the thin sheet matrix shown in Figure 1.
Figure 1:
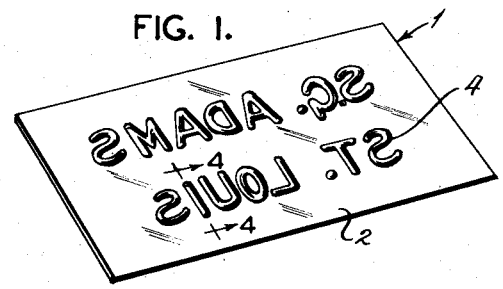
Figure 1 is a view in perspective of the embossed side of a thin sheet matrix for use with this invention.
Figure 5:
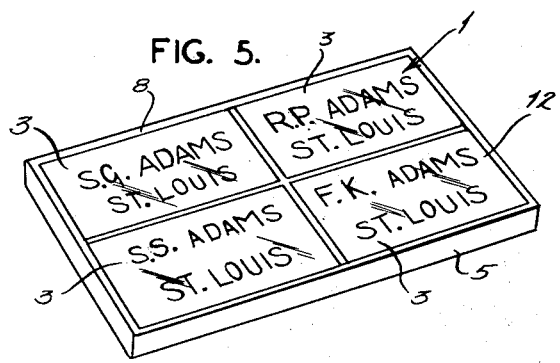
Figure 5 is a view in perspective of a gang of four separate thin sheet matrices mounted in a frame, for molding simultaneously four rubber stamps.
Figure 3:
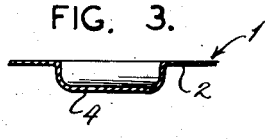
Figure 3 is a sectional view taken along the line 3—3 of Figure 2.
Figure 4:
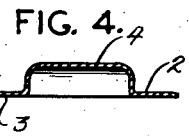
Figure 4 is a sectional view taken along the line 4—4 of Figure 1.

Referring now to the illustrative embodiment of this invention shown in the drawings, 1 represents a thin sheet matrix for use in this invention. In the drawings, the matrix is an ordinary "Addressograph" plate, and will be referred to as such throughout the remaining description. The Addressograph plate 1 has an embossed side 2 from which characters 4 are raised, and an indented side 3 into which such characters are sunk. In Figure 5, four separate Addressograph plates, separately embossed, are set as a gang 12 within a frame member 5 to produce four separate rubber stamps in one molding operation.

Figure 6:
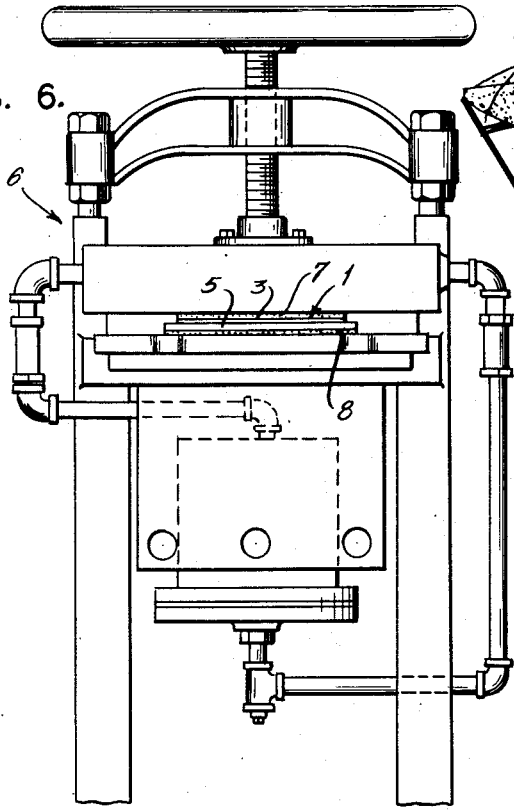
Figure 6 is a view in side elevation of a rubber stamp vulcanizing press with a gang of matrices as shown in Figure 5 positioned therein.

In Figure 6, an unmolded, unvulcanized sheet of rubber 7 is shown applied directly to the debossed side of the gang 12 shown in Figure 5, within a vulcanizing press 6 of the character commonly employed for making rubber stamps. The gang 12, in frame 5, may rest upon a cushion of resilient material 8.

Figure 7:
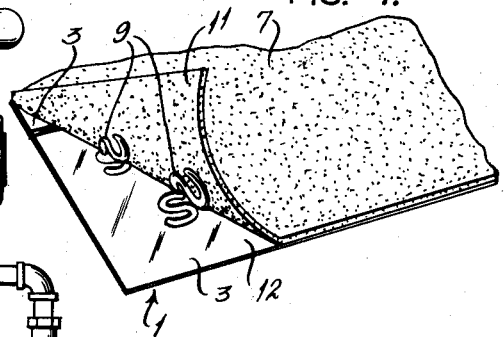
Figure 7 is a view in perspective showing a molded rubber stamp partly stripped from the indented side of a thin sheet matrix.

After the vulcanization is completed the frame 5 with its adhering (now vulcanized) sheet 7 is removed from the press, and the molded and vulcanized sheet 7 stripped from the indented side 3 of the gang 12, as shown in Figure 7. The characters 9 molded onto sheet 7 are raised from the surface 11 of the stamp.

Figure 8:
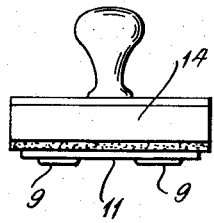
Figure 8 is a view in side elevation of one type of finished rubber stamp.

In Figure 8, one of the four stamps molded together on the sheet 7 has been cut from the sheet, trimmed and mounted on the usual base 14 to form one type of finished rubber stamp. This particular type of mounting is, however, not a part of this invention and is shown simply by way of illustration.

In making a rubber stamp by the process of this invention as illustrated in the drawing, Addressograph plate 1 is embossed by a so-called "Graphotype" machine, or any comparable machine. In such a machine, a standard typewriter keyboard and space bar may be provided so that anyone who can operate a typewriter can produce a suitable plate. Hand-operated Graphotype machines, that is, machines which are not provided with a keyboard but in which the spacing and alignment of the characters are mechanically accomplished, may equally well be employed. While the normal object of the Graphotype machine is to emboss characters on the thin metal plate, which embossments are used as printing elements, the reverse side of the plate is correspondingly indented.

In the process illustrated in the drawing, four separate indented Addressograph plates are mounted in a frame 5 to make a gang 12 with the indented sides of the plates up as shown in Figure 5. A sheet of the plates in unvulcanized rubber 7 is placed over the indented side of the gang, and the assembly is placed on a resilient pad 8 within the vulcanizing press, with the unvulcanized sheet up.

Instead of assembling a plurality of separate plates 1 in a gang, as above described, it will be understood that a continuous sheet or strip may be indented in one area for one stamp, in another area for another stamp, etc.

While heat and pressure are applied to the assembly by the press, the unvulcanized rubber flows into the indented character indentations in plate 1, and the sheet is vulcanized.

The molded and vulcanized sheet is stripped from the face of the gang. The four sections produced by the gang on the sheet are cut apart, trimmed, and mounted in any suitable manner to form completed rubber stamps.

While the process has been described as using Addressograph plates embossed on the Graphotype machine, any other suitable embossing machine may be used to emboss thin sheet matrices whether or not of the Addressograph type. The thin sheets from which the matrices are made may be any embossable material, by which is meant a material which will take and hold a sharp impression from machines of the type aforesaid, and yet be sufficiently strong (at the thinness necessary for characters intaglioed on one side to be reproduced in relief on the opposite side) to withstand the heat and pressure of the vulcanizing press. Metal is commonly employed for such plates, but some plastics are suitable.

Since the term "rubber" as used in the specification and claims includes other suitable materials, it can be seen that the composition applied to the matrix to form the molded stamp need not be in sheet form. It is also clear that the number of matrices employed in one gang is limited only by the capacity of the vulcanizing press.

The process of this invention has numerous advantages over the methods heretofore employed. An important advantage is the speed of using the typewriter keyboard method of indenting and making a complete rubber stamp mold in one operation as against the standard method of setting the type and then making a mold from the type which has been set. Also, the matrix formed is light, compact, cheap to manufacture, and reasonably permanent. Furthermore, since in indenting such a matrix, the machine used embosses one side of the matrix, a proof may be taken from the matrix itself before the stamp is molded. In machine indenting, moreover, provision is made for producing characters of even depth so that the stamp resulting therefrom will print with uniform intensity over its entire face.

Having thus described the invention, what is claimed and desired to be secured by Letters Patent is:

1. The process of making rubber stamps which comprises providing an apparatus having a series of individually actuable indenting elements whose faces have protuberances shaped to correspond respectively with the mirror image of alphabetical characters, supplying said apparatus with mold material in strip form which is receptive to indentation by said elements, actuating the indenting elements one at a time in selected sequence to indent the mold material with chosen characters, then compressing rubber on the indented surface of and into the indentations in said mold material, and vulcanizing the rubber while so compressed.

2. The process of claim 1 wherein the mold material in strip form is embossable and said indenting elements simultaneously form indentations on one side and corresponding embossments on the opposite side of said material in strip form, said embossments constituting a printing element.

RANDOLPH P. ADAMS.

References Cited in the file of this patent

UNITED STATES PATENTS

| Number | Name | Date |
| --- | --- | --- |
| 1,588,278 | Stenz | June 8, 1926 |
| 1,858,978 | Bain et al. | May 17, 1932 |
| 1,986,637 | L'Hollier | Jan. 1, 1935 |
| 2,001,491 | Hendey | May 14, 1935 |
| 2,075,636 | Browne | Mar. 30, 1937 |
| 2,186,881 | Parsons | Jan. 9, 1940 |
| 2,446,771 | Knowland | Aug. 10, 1948 |